(12) United States Patent
Kauffman

(10) Patent No.: US 7,031,979 B2
(45) Date of Patent: Apr. 18, 2006

(54) REPORT GENERATION SYSTEM AND METHOD

(75) Inventor: Mark Bykerk Kauffman, Chico, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 567 days.

(21) Appl. No.: 09/945,292

(22) Filed: Aug. 31, 2001

(65) Prior Publication Data

US 2003/0046264 A1 Mar. 6, 2003

(51) Int. Cl.
*G06F 17/00* (2006.01)
(52) U.S. Cl. .................................... 707/104.1
(58) Field of Classification Search ............. 707/1–10, 707/102, 104.1
See application file for complete search history.

(56) References Cited

U.S. PATENT DOCUMENTS

| | | | | |
|---|---|---|---|---|
| 5,423,033 A * | 6/1995 | Yuen | ............................. | 707/4 |
| 5,721,903 A * | 2/1998 | Anand et al. | .................. | 707/3 |
| 5,870,746 A * | 2/1999 | Knutson et al. | ............. | 707/10 |
| 5,945,990 A * | 8/1999 | Morrison et al. | ........... | 345/748 |
| 6,233,583 B1 * | 5/2001 | Hoth | .............................. | 707/3 |
| 6,292,801 B1 * | 9/2001 | Campbell et al. | ............. | 707/10 |
| 6,539,371 B1 * | 3/2003 | Bleizeffer et al. | .............. | 707/2 |
| 6,613,099 B1 * | 9/2003 | Crim | ......................... | 707/102 |
| 6,631,402 B1 * | 10/2003 | Devine et al. | ............. | 709/217 |
| 6,650,346 B1 * | 11/2003 | Jaeger et al. | ............... | 715/764 |
| 6,656,683 B1 * | 12/2003 | Reuben et al. | .............. | 345/418 |

* cited by examiner

*Primary Examiner*—Jean M. Corrielus
*Assistant Examiner*—Anh Ly

(57) ABSTRACT

The present invention is directed to a system and method of improved report generation. In one embodiment, the present invention provides a computer-implemented report generation system that generally includes a first generator and a second generator. The first generator is operably linked through a first interface to one or more associated first type components which invokes first type components to generate a report element of the first type. Likewise, the second generator is operably linked through a second interface to one or more associated second type components which invokes second type components to generate a report element of a second type. The first and second type generators each invoke at least one component in response to processing first and second type included component sections that identify the at least one first and second type components to be invoked.

21 Claims, 9 Drawing Sheets

| Variable | Output Text |
|---|---|
| 411 {MTALoad_Q_Peak_No_Prob_Findings | No excessive peaks were detected in the MTA work queue. } 412 |
| 413 {MTALoad_Q_Peak_No_Prob_Recommendations | No changes are recommended. } 414 |
| 415 {MTALoad_Q_Peak_Prob_Findings | One or more significant peaks occurred in the MTA work queue. The likely source of these peaks is a communication problem between the MTA and another Exchange component on this server, a connector, or a remote Exchange MTA. } 416 |
| 417 {MTALoad_Q_Peak_Prob_Recommendations | (1) Verify that all servers with large backlogged MTA queues bound for them are accessible over the network. (2) Verify that all Exchange services, including the MTA, are up and running on all servers in the organization. (3) Check the application event log in chapter 6 for additional information on specific errors. } 418 |

FIG. 4

Message Transfer Agent
Background
The message Transfer Agent (MTA) is responsible for managing messages that must be transferred to or from a non-local e-mail server. This includes other Exchange servers and non-Exchange e-mail servers (Lotus Notes, SMTP, cc:Mail, etc.). The MTA also manages distribution lists for messages.

MTA queue lengths provide a general indication of Exchange performance. In general, on a well configured Exchange server, the queues will be close to 0. On a system exceeding its capacities, the queue will approach 2. Should a queue length regularly exceed 2, the system will be perceptibly slow.

While high queue times may indicate a problem with Exchange, a backlog of messages on the MTA may actually be an indication of a problem elsewhere in the system. Typically, these other problems include connectivity problems with other servers, including the following: — 510A
- There may be network problems prohibiting data transfer.
- There may be network security issues (site connectors between two domains with different service accounts).
- Other Exchange systems may be shut down or their Exchange services may be stopped.

An additional factor that affects MTA performance is the amount of external mail being processed by the server. Because Exchange handles internal mail (mail sent to a recipient on the same server) more efficiently and faster than external mail, high levels of external mail increase the amount of MTA-dependent processes.

Analysis
Our analysis of the Message Transfer Agent consisted of examining the lengths of <Name_Field> MTA queues and the periods of peak MTA queue length. — 515A

Selected Data
Graph 1 - MTA Work Queue Length. The MTA Queue Length is the one-hour average number of outstanding messages in the MTA queue that had not been processed to completion. The High Queue Length represents the highest value monitored during each hour. This counter provides an overall health rating for the MTA. — 510B 510C — Message Transfer Agent Queue Length
<XCHGRAPH 4.Graph Field> — 530A

FIG. 5A

510D { The foilllowing table lists the eight time periods in Graph 1 with the highest MTA queue lengths. The times shown reflect the end of the hour in which a peak value occurred.
One-hour Periods in which Peak MTA Queue Lengths Occurred <XCHGTABLE 9.Table Field> — 540A 510E { Findings and recommendations Regarding the Message Transfer Agent
During the monitored period, <XCHMTA.ANALYZER_1 Field> — 520A 510F { Recommended actions are to <XCHMTA.ANALYZER_2 Field> — 520B

*FIG. 5B*

Agent
*Background*
The Message Transfer Agent (MTA) is responsible for managing
messages that must be transferred to or from a non-local e-mail server.
This includes other Exchange servers and non-Exchange e-mail servers
(Lotus Notes, SMTP, cc:Mail, etc.). The MTA also manages distribution
lists for messages.
MTA queue lengths provide a general indication of Exchange
performance. In general, on a well configured Exchange server, the queues
will be close to 0. On a system exceeding its capacities, the queue will
approach 2. Should a queue length regularly exceed 2, the system
will be perceptibly slow.
While high queue times may indicate a problem with Exchange, a backlog
of messages on the MTA may actually be an indication of a problem
elsewhere in the system. Typically, these other problems include
connectivity problems with other servers, including the following:
- There may be network problems prohibiting data transfer.
- There may be network security issues (site connectors between two domains
  with different service accounts).
- Other Exchange systems may be shut down or their Exchange services
  may be stopped.

An additional factor that affects MTA performance is the amount of external
mail being processed by the server. Because Exchange handles internal mail
(mail sent to a recipient on the same server) more efficiently and faster than
external mail, high levels of external mail increase the amount of MTA-dependent
processes.

*Analysis*
    Our analysis of the Message Transfer Agent consisted of examining
    the lengths of <u>XBO104's</u> MTA queues and the periods of peak
    MTA queue length. —620A

*Selected Data*
    <u>Graph 1</u> - MTA Work Queue Length. The MTA Queue Length is the
    one-hour average number of outstanding messages in the MTA
    queue that had not been processed to completion. The High Queue
    Length represents the highest value monitored during each hour.
    This counter provides an overall health rating for the MTA.

*FIG. 6A*

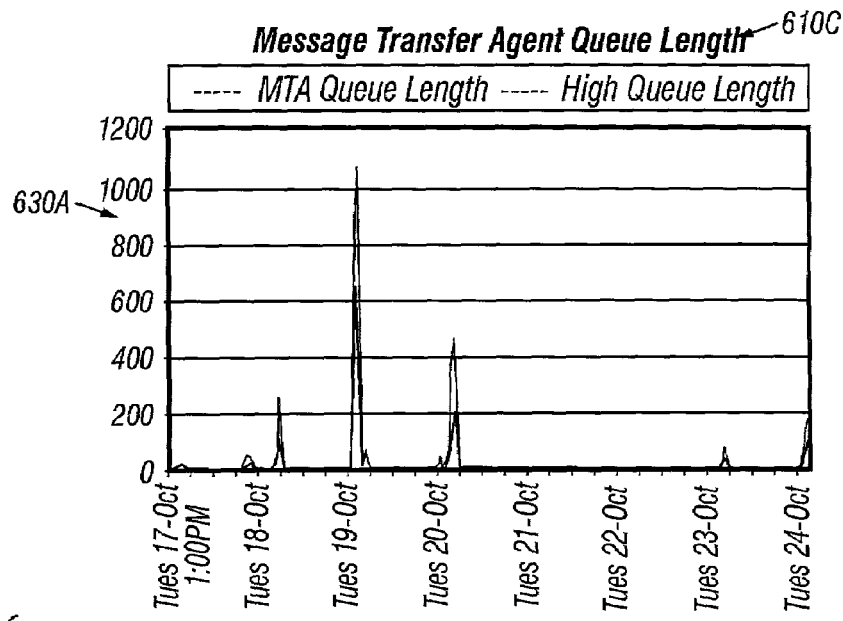

Message Transfer Agent Queue Length — 610C

----- MTA Queue Length ----- High Queue Length

610D { The following table lists the eight time periods in Graph 1 with the highest MTA queue lengths. The times shown reflect the end of the hour in which a peak value occurred.
One-hour Periods in which Peak MTA Queue Lengths Occurred

| DATE | END TIME OF ONE-HOUR PERIOD IN WHICH PEAK VALUE OCCURRED: | PEAK GRAPH LENGTH |
|---|---|---|
| 10/13/00 | 6:00 PM | 250.7 |
| 10/14/00 | 2:00 PM | 820.5 |
| 10/14/00 | 3:00 PM | 1066.9 |
| 10/15/00 | 3:00 PM | 95.1 |
| 10/15/00 | 4:00 PM | 401.9 |
| 10/15/00 | 5:00 PM | 448.9 |
| 10/18/00 | 5:00 PM | 72.3 |
| 10/19/00 | 3:00 PM | 172.1 |

610E { Findings and Recommendations regarding the Message Transfer Agent
During the monitored period, one or more significant peaks occurred in the MTA work queue. The likely source of these peaks is a communication problem between the MTA and another Exchange component on this server, a connector, or a remote Exchange MTA.

610F Recommended actions are to (1)Verify that all servers with large backlogged MTA queues bound for them are accessible over the network. (2)Verify that all Exchange services, including the MTA, are up and running on all servers in the organization. (3)Check the application event log in chapter 6 for additional information on specific errors.

FIG. 6B

REPORT GENERATION SYSTEM AND METHOD

BACKGROUND

Report generation systems are used to streamline the process of transforming raw data, relating to the performance or quality of a subject (e.g., server, network, system), into a report for efficiently conveying relevant information contained within the data. It is desirable for these systems to be able to include various types of information including text, table, and graph elements within the generated report. Existing report generating systems with such capabilities are typically implemented with computer programs specifically written for a desired report to be generated. Unfortunately, however, such systems are not very flexible in that they can only generate a specific type of report. In other words, a separate program is required for each different type of report. Likewise, when the form or content of a report needs to be modified, the entire program must be appropriately modified. Not only can this consume excessive programmer time, but it also results in large files being transferred and/or displaced when an existing system is being updated.

SUMMARY OF THE INVENTION

The present invention is directed to a system and method of improved report generation. In one embodiment, the present invention provides a computer-implemented report generation system that generally includes a first generator and a second generator. The first generator is operably linked through a first interface to one or more associated first type components which invokes first type components to generate a report element of the first type. Likewise, the second generator is operably linked through a second interface to one or more associated second type components which invokes second type components to generate a report element of a second type. The first and second type generators each invoke at least one component in response to processing first and second type included component sections that identify the at least one first and second type components to be invoked.

BRIEF DESCRIPTION OF THE DRAWINGS

FIG. 4 depicts a variable text definitions record for the exemplary report generation system of FIGS. 2 and 3;

FIGS. 5A and 5B depict a report template for the exemplary report generation system of FIGS. 2, 3, and 4; and FIGS. 6A and 6B depict a final report generated from the exemplary report generation system of FIGS. 2, 3, 4, 5A, and 5B.

DETAILED DESCRIPTION

The present invention provides a report generation system that can be expanded and/or modified while the core program remains in place. Separate program components are used for creating the report elements that can be included in a report. In generating a report, a report generator processes included-components section(s) that are associated with the report. Note that the term section is used in this document instead of the term table to avoid confusion between the usage of the word table to refer to a table in the report and table to refer to a database construct. Also this document will use the term record to refer to an entire set of database tables, while the term entry will be used to refer to one record in a database table. The included components section(s) define the specific components to be invoked for generating the desired elements that will be included in the report. That is, the included components section(s) defines the report by determining which elements will be generated and included within the report. The use of included components section(s) results in several advantages over existing schemes. In order to modify a report format, changes only need to be made to the relevant included components section(s), along with appropriate changes to, or additions of (if necessary), certain components. Among other things, this reduces the amount of code sent to customers when modifications are made. It also reduces the programming time required to create new types of reports.

Figure 1A:
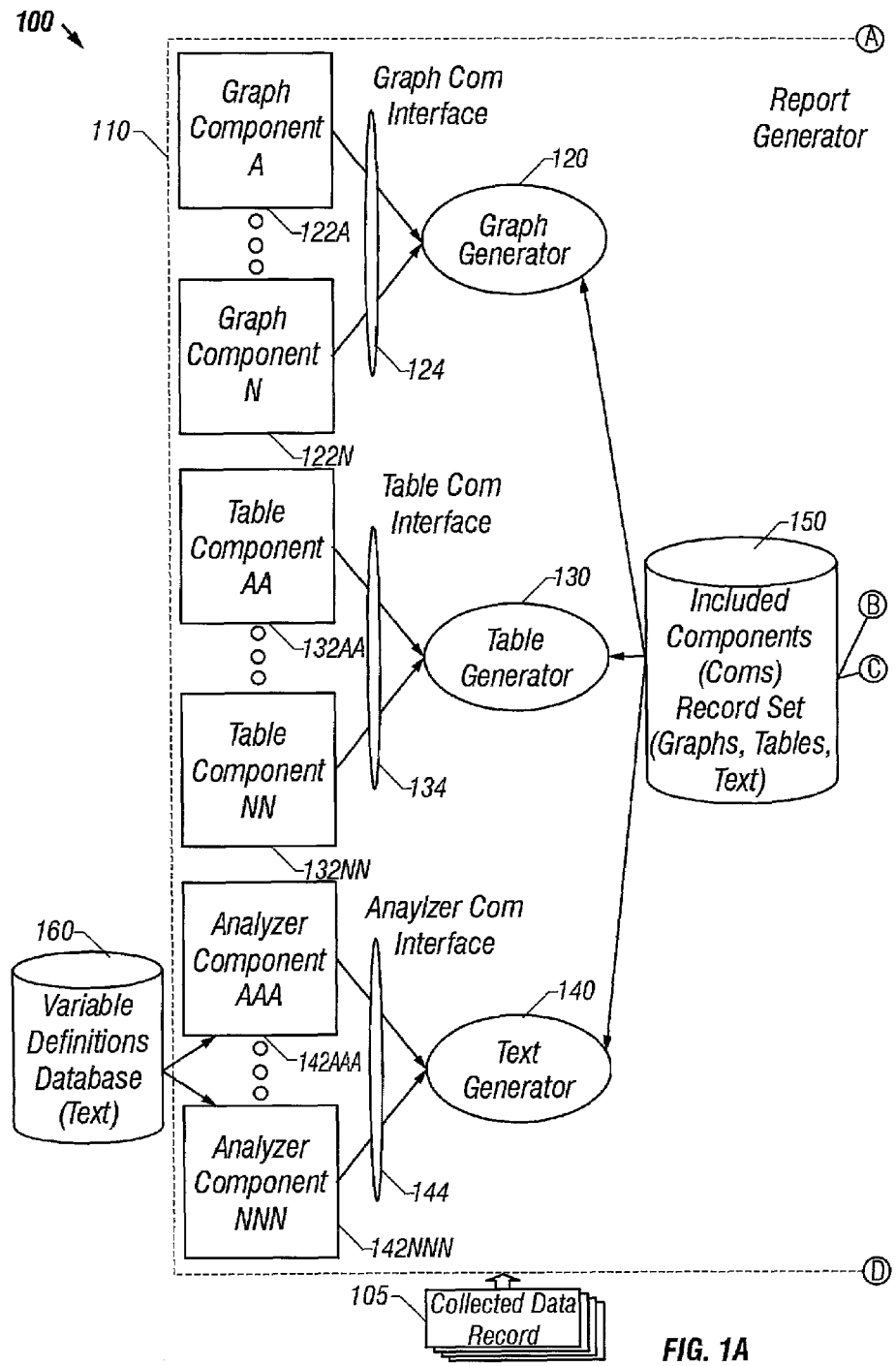
FIGS. 1A and 1B depict one embodiment of a report generation system of the present invention.
Figure 1B:
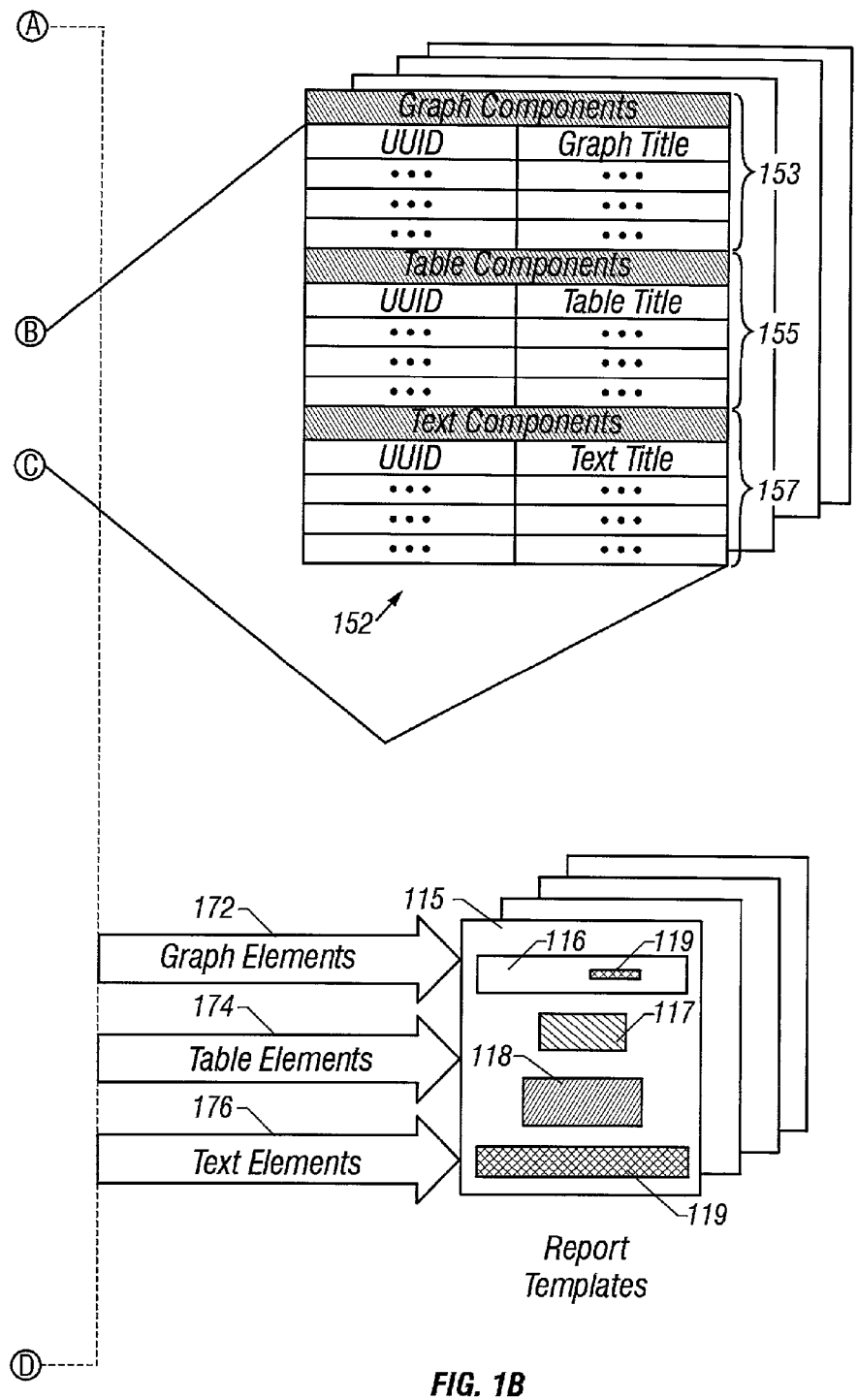

FIGS. 1A and 1B show one embodiment of a Report Generation System 100 of the present invention. Report generation System 100 generally includes a report generator 110, a collected data record 105, and a corresponding report template file 115. The collected data record 105 is input to report generator 110 and provides it with collected data that will be the subject of the generated report. From the collected data, the report generator 110 generates report elements, for example graph elements 172, table elements 174, and text elements 176. These elements are combined with the report template file 115 for creating the final report (or report file).

The collected data record 105 includes one or more parameters associated with the system for which the report is to be generated. For example, a server such as an e-mail server could be monitored and data associated with its various operational parameters would then be collected in a collected data record 105. These parameters could include, for example, CPU work load, work Q length, inbound message total, outbound message total, received message rate, and the like. Report elements (graphs 172, tables 174, text 176) would be generated to describe the operation of the server based on processed combinations of these data parameters.

The report template file 115 serves as the foundation for the generated final report for a given report type. It includes constant information sections 116 and variable information fields 117, 118, 119. The constant information sections 116 can contain information of any type (e.g., graph, table, text) that will be part of every report instance for the given report type. Conversely, the variable information fields 117, 118, 119 identify the variable portions of the report that will receive (or be filled by) the generated report elements 172, 174, 176. In the depicted embodiment, there are several different types of fields that may be included within a template 115. These fields include graph information fields 117, table information fields 118, and text information fields 119. A graph information field 117 identifies a specific graph element 172 and specifies where it is to be inserted in the generated report. Likewise, a table information field 118 identifies a specific table element 174 and specifies where it is to be inserted in the report. Finally, a text data field 119 identifies a specific text element 176 and specifies where it is to be inserted in the generated report. In generating a report, the report generator 110 calls on the different components to create graph elements 172, table elements 174, and text elements 176, which will be inserted into their appropriate fields within the report template file 115.

Any suitable scheme may be used for implementing a report template. In one embodiment, an MS WORD word processing application is utilized for processing a MS WORD-based report template file 115. Compatible report elements (e.g., .gra graphs, .xls tables, .doc text files) are generated by the report generator 110 and made available to the MS WORD application. Suitable macros are provided for processing the variable information fields 117, 118, 119 in order to retrieve the appropriate report elements and insert them into the proper portions of the report template file 115 for creating the final report file.

A report generation system 100 can include numerous collected data records 105 and numerous report templates 115 for generating a variety of different reports (e.g., for different customers and different monitored systems). In addition, different instances of a given collected data record 105 can be used to generate different resulting report instances. For example, a particular collected data record 105 could be used for storing collected operating parameter data for a server system on a weekly basis. Each week, an updated instance of the collected data record 105 would be used to generate an updated report.

In a preferred embodiment, the report generator 110 is a component based system that generally includes a graph generator 120, a table generator 130 and generator 140, along with included coms ("components") record set data base 150 and a variable definitions data base 160. Each type of generator (graph 120, table 130, text 140) is operably linked through a common interface to one or more associated components for generating separate element options of the associated type (graph, table, text). In the depicted embodiment, graph generator 120 is operably linked to graph components 122A through 122N, via graph com interface 124. Similarly, table generator 130 is operably linked to table components 132AA through 132NN, via table com interface 134. Finally, the text generator 140 is linked to text analyzer components 142AAA through 142NNN, via a text analyzer com interface 144.

As used herein, the term "component" refers to program modules that are designed to inter-operate with each other at runtime. Components can be large or small. They can be written by different programmers using different development environments and they may or may not be platform independent. They may be implemented with any suitable scheme including but not limited to COM+, CORBA, and other component-based technologies. In the depicted embodiment, a client/server architecture is employed, in which the generator components (120, 130, 140) serve as client applications and are designed as containers for instantiating their respective one or more associated element generating components (122A–N, 132AA–NN, 142AAA–NNN) as needed.

The interfaces 124, 134, and 144, correspond to the collection of methods that can be invoked by the generators 120, 130, 140, respectively, each interface includes at least one method for causing a component to generate an element of its given type.

The included components (coms) record set database 150 comprises included com records 152, which are processed by generators 120, 130, 140 in order to generate the report elements 172, 174, 176. Each included components record 152 preferably has one or more of a graph element section 153, a table element section 155, and/or an analyzer element section 157 for identifying the specific graph, table, and/or analyzer components to be invoked for generating the desired, predefined elements that will be included within the report. Each section 153, 155, 157 comprises a table (or list) of one or more component entries, with each com entry corresponding to a specific component that will be invoked by a generator. Each entry preferably includes, in one column, a unique universal identifier ("UUID") and, in another column, a descriptive component title. The UUID identifies the component associated with the entry. Because each component generates a separate one or more elements, each component entry corresponds to a separate one or more elements that will be included in the final output report file. Thus, a report can be modified to add or remove elements, simply by changing, adding, or removing com entries within the included components record that is associated with the report that is to be so modified. The separate included components sections 153, 155, 157 can be part of the same record (as in the depicted embodiment) or alternatively, organized into separate records and/or stored in separate databases, if so desired.

The variable definitions data base 160 contains text to be used by the text analyzer components in generating their respective elements. For example, with regard to the text analyzer components 142AAA–142NNN, the variable definitions data base 160 includes tables of text excerpts that are mapped to specific variable values. When a text analyzer component is invoked to generate a text element, the element retrieves data from the collected data record 105 and derives one or more values corresponding to messages to be conveyed in the report. The derived values would then be used to retrieve the appropriate text excerpt element(s) from database 160.

The record sets 150 and 160 can be implemented with any suitable database server for storing and providing to the generators 120, 130, and 140 included components records/sections, variable definitions, and element generating components/definitions (if so implemented). These database servers can be implemented with any suitable database scheme including but not limited to flat-file, hierarchical, relational, and object-oriented databases. Similarly, the various generator components (120, 130, 140), the element generating components (122, 132, 142), and database servers can be implemented with any suitable combination of one or more computers, including but not limited to mainframes, workstations, or personal computers, running operating systems such as Windows NT, UNIX, LINUX, or any other computer operating system.

In operation, a collected data record 105 is input to the report generation system 110. This causes the generators 120, 130 and 140 to retrieve and process appropriate included components sections 153, 155, 157, respectively, as needed. Appropriate sections may be designated by a user or they may have been previously associated with the particular collected data record 105. In processing its included components section, each generator instantiates and invokes one or more element generating components, as identified in the included components sections to generate particular elements based on the collected data within the collected data record 105. These generated elements are then made available to a report template file 115 that is associated with the retrieved and processed included components sections. Finally, the elements are inserted into their appropriate variable fields within the template 115 resulting in a generated final report (or report file).

Figure 2:
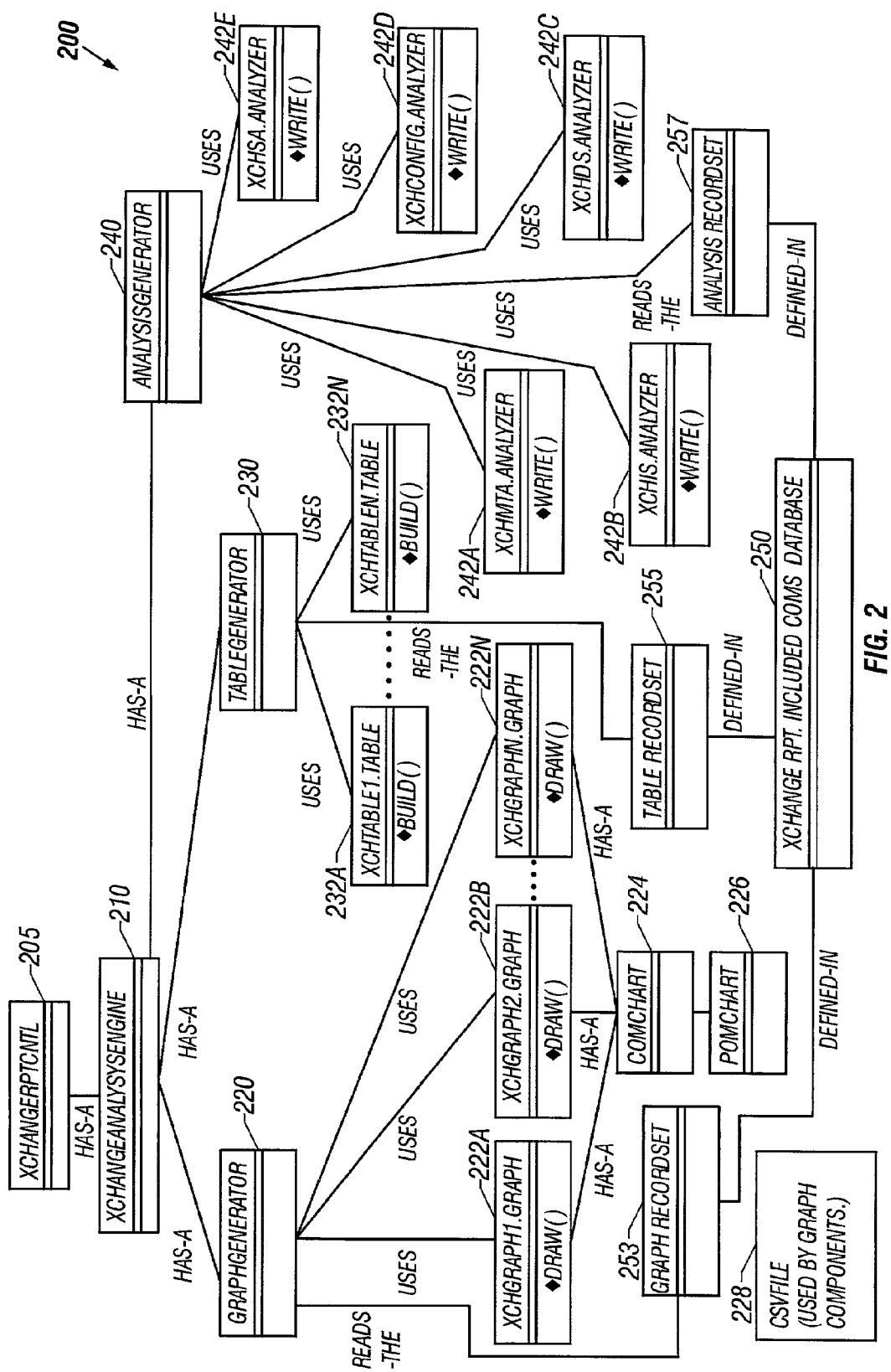
FIG. 2 depicts the component structure of an exemplary report generation system of the present invention.

With reference to FIGS. 2–6B, a simple example illustrating a representative portion of a Microsoft Xchange mail server report generation system will now be presented. FIG. 2 depicts one particular component structure 200 for implementing the exemplary report generation system. The highest level component is the Xchange report control component 205. It includes an Xchange analysis engine component 210. In turn, Xchange analysis engine component 210 further includes graph generator component 220, table generator 230, and analysis generator 240. Xchange analysis engine component 210 corresponds to the report generator block 110 from FIG. 1. Similarly, the graph generator, table generator, and analysis generator components 220, 230, 240 correspond to the graph, table, and text generator blocks 120, 130 and 140, respectively, from FIG. 1.

The graph generator component 220 is operably linked through a common interface to Xchange graph components 222A through 222N. Each Xchange graph component corresponds to a separate component for generating a particular one or more graphs available to the system. CSV file 228 is a raw data file comprising information to be formed into a graph. The interface between these Xchange graph components 222 and the graph generator 220 includes at least a "draw" method, which allows the graph generator 220 to invoke a selected graph component to generate the one or more graph elements. In addition, each Xchange graph component 222A through 222N, includes a COM chart component 224, which in turn includes a POM chart DLL 226. The COM chart component is merely a COM wrapper or interface for the POM chart DLL. The COM chart allows each graph component to use COM to make calls to the non-COM code in POM chart. The POM chart 226 or performance optimization module chart is a DLL (dynamic link library) that contains methods that are used to convert CSV file 228 into graphs. The POM chart DLL does the actual work of converting collected data into a graph.

Similarly, the table generator component 230 is operably linked through a common interface to Xchange table components 232A through 232N. Each of these components corresponds to a separate one or more table options that can be generated within the report generation system. The interface between the table generator 230 and each of the table components 232A through 232N includes at least a "build" method, which when invoked by table generator 230 causes the invoked component to generate a particular one or more table elements. Thus, each graph component uses POM chart, via COM chart, to convert a graph record set into a CSV file which is then converted into a graph for inclusion in the report.

Finally, the analysis generator 240 is operably linked through a common interface to Xchange analyzer components 242A through 242E. In the depicted embodiment, these components include an MTA analyzer component 242A, an IS analyzer component 242B, a DS analyzer component 242C, a CONFIG analyzer component 242D, and an SA analyzer component 242E. Each of these components corresponds to a separate one or more text element(s) for describing the operational performance of various parameters in an Exchange mail server. The interface between analysis generator 240A and each of the analyzer components 242A through 242E includes at least a "write" method, which when invoked by analysis generator 240, causes a particular one or more text elements to be generated.

Also shown in FIG. 2 is the Xchange report included components database 250. This database includes the various included components records, which define the possible reports that can be generated by the system. Included components database 250 comprises a graph record set 253, a table record set 255, and an analysis (text) record set 257. Each of the records in these record sets correspond to an included components section from FIG. 1, and are associated with a particular report to be generated, along with a particular report template file. Accordingly, each record (or section) includes one or more component identifiers for identifying the components from its generator type (graph, table, analyzer) that will be invoked for its associated report.

With respect to the depicted embodiment, the "has a" items are explicitly defined at compile time, while the "uses" items are defined in the included components database 250. In this embodiment, database 250 is used not only for storing the included components records/sections, but also, it is used for storing/defining the utilized variable definitions. Thus, database 250 corresponds to both the included coms database 150 and the variable definitions database 160 from FIG. 1. The generators 220, 230, and 240 determine which element generating "uses" components (222, 232, 242) to instantiate at run-time by processing (e.g., reading) the included components sections for a particular report that is to be generated. The items of FIGS. 2–6B, including the text, the graph, and table components 222A–22N, 232A–232N are generically represented for illustrative purposes but in an actual implementation would have specific names corresponding to the information or parameters they are to convey.

Figure 3:
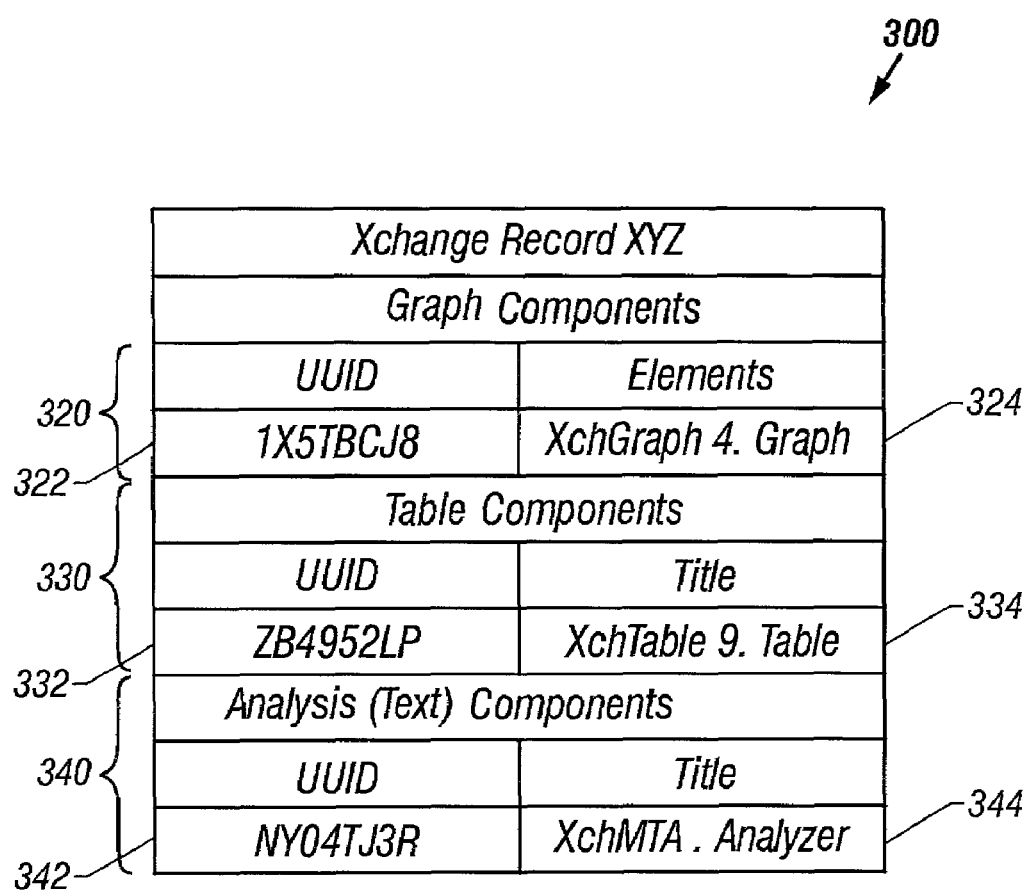
FIG. 3 depicts an included components record for the exemplary report generation system of FIG. 2.

FIG. 3 shows the included components record 300 that is used in this example. Record 300 includes a graph section 320, a table section 330, and an analysis section 340. In the graph section, one graph component entry is shown. This entry includes UUID "1X5TBCJ8" at 322 with an associated component title "XchGraph4.Graph" at 324. The table section 330 also has a single component entry, which has UUID "ZB4852LP" at 332 with an associated component title "XchTable9.Table" at 334. Likewise, the analysis section 340 has a single component entry, which has UUID "NY04TJ3R" at 342 with an associated component title "XchMTA.Analyzer" at 344. Thus, in this example, three components are invoked for the generation of three elements an XchGraph4 graph element, an XchTable9 table element, and an XchMTA analyzer element. These elements are provided to an associated report template file, which will be presented below with respect to FIGS. 5A and 5B.

FIG. 4 shows a portion of the text definitions that are used by the XchMTA analyzer component 242A in this example. These definitions are stored in database 250 and correspond to the variable definitions described with respect to database 160 from FIG. 1. Variable values 411, 413, 415 and 417 map to text excerpts 412, 414, 416 and 418, respectively. When invoked by the analysis generator component 240 (in response to processing the included components section 340), the XchMTA analyzer component 242A retrieves and processes relevant collected data (from a collected data record not shown) corresponding to the MTA parameter(s) that are to be described by the text. The XchMTA component 242A processes this data and derives one or more of the depicted values, 411, 413, 415, or 417 based on desired, predefined criterion within the component. The invoked component 242A then retrieves the text excerpt(s) 412, 414, 416, or 418 that correspond to the derived value(s) and provides the retrieved excerpt(s) to the report template as text element(s) for insertion therein.

FIGS. 5A and 5B show the record template for this example. It corresponds to a Word-based record template file. The record template comprises constant information sections 510A through 510F, variable graph information field 530A, variable table information field 540A, and variable text information fields 520A, 520B. It also includes a server name field 515A embedded within constant information field 510A. When the various components identified by included coms record 300 are invoked, report elements for each of these variable fields are generated and made available to the report template processor, which in this example is a Word application with suitable Macros. In processing the Word template file, the Word application retrieves and inserts the generated report elements into their corresponding fields. It also inserts the name of the server into the name field 515A.

FIGS. 6A and 6B show the final report file after the elements have been so inserted. As depicted in the drawings, constant text sections 610A through 610F, which correspond to the constant information sections 510A–510F, are carried through from the report template to the final report. In addition, the server name, "XB0104" at 615A appears in the appropriate name field location. Likewise, the XchGraph 4 graph element appears at 630A in its graph field location; the XchTable 9 table element appears at 640A in its table field location; and the XchMTA text elements appear at 620A and 620B in their text field locations.

What is claimed is:

1. A computer-implemented report generation system, comprising:
   a first generator, operably linked through a first interface to one or more associated first type components, which invokes at least one first type component to generate a report element of a first type; and
   a second generator, operably linked through a second interface to one or more associated second type components, which invokes at least one second type component to generate a report element of a second type;
   wherein said first and second generators each invoke at least one component in response to processing first and second type included component sections that respectively identify the at least one first and second type components to be invoked.

2. The system of claim 1 wherein the invoked at least one first and second type components acquire data from a collected data record and generate the report elements based on said acquired data.

3. The system of claim 2 wherein the collected data record is associated with the first and second type included component sections.

4. The system of claim 3 wherein the generated report elements are adapted to be combined with a report template file that is associated with the collected data record.

5. The system of claim 4 wherein the report template file includes at least one of:
   at least one constant information section, at least one first type information field and at least one second type information field
   wherein the at least one first type and at least one second type information fields receive the generated at least one first and second type report elements.

6. The system of claim 1 wherein the one or more first type components generate one of graph elements, text elements, and table elements.

7. The system of claim 1 wherein the one or more second type components generate one of text elements, graph elements, and table elements.

8. The system of claim 1 further comprising a third generator operably linked through a third interface to one or more associated third type components, which invokes at least one third type component to generate a report element of a third type.

9. The system of claim 8 wherein the one or more third type elements generate one of:
   text elements;
   graph elements; and
   table elements.

10. A system of claim 1 wherein the system is implemented by a memory storage device having executable instructions.

11. The system of claim 1 wherein the first and second included component sections are contained in a common included components record.

12. A report generation system implemented on one or more computers, comprising:
    a first generator, operably linked through a first interface to one or more associated first type components for invoking at least one first type component to generate a report element of a first type;
    a second generator, operably linked through a second interface to one or more associated second type components for invoking at least one second type component to generate a report element of a second type; and
    a database having at least one included components record, wherein said first and second generators each invoke at least one component in response to processing a selected one of the at least one included components records and the selected one included components record identifies the at least one first and second type components to be invoked.

13. The system of claim 12 wherein the invoked at least one first and second type components generate their respective report element from data acquired from a collected data record that is associated with the selected one included components record.

14. The system of claim 13 wherein the generated report elements are adapted to be combined with a report template file that is associated with both the collected data record and selected one included components record.

15. The system of claim 14 wherein the report template file includes at least one of:
    at least one constant information section, at least one first type information field, and at least one second type information field, wherein at least one first type and at least one second type information field receive the generated at least one first and second type report elements.

16. The system of claim 12 wherein the one or more first type component generates a graph element, and the one or more second type component generates a text element.

17. The system of claim 12 further comprising a variable definitions database for providing first and second type element information to the first and second type components.

18. A computer implemented method for generating a report, comprising:
    processing a first type included components section that identifies at least one type component;
    invoking the identified at least one first type component to generate at least one corresponding first type report element;
    processing a second type included components section that identifies at least one second type component;
    invoking the identified at least one second type component to generate at least one corresponding second type report element; and operably combining said generated first and second type report elements with a report template file that is associated with the first and second included components sections to generate the report.

19. The method of claim 18 wherein the act of operably combining includes:
processing the report template file with a word processing program that retrieves the generated first and second type report elements.

20. The method of claim 18 wherein the first and second type included components sections are part of a common included components record.

21. The method of claim 18 further comprising the act of:
acquiring data from a collected data record that is associated with the report template file, wherein the generated report is based on the acquired data.

* * * * *